UNITED STATES PATENT OFFICE.

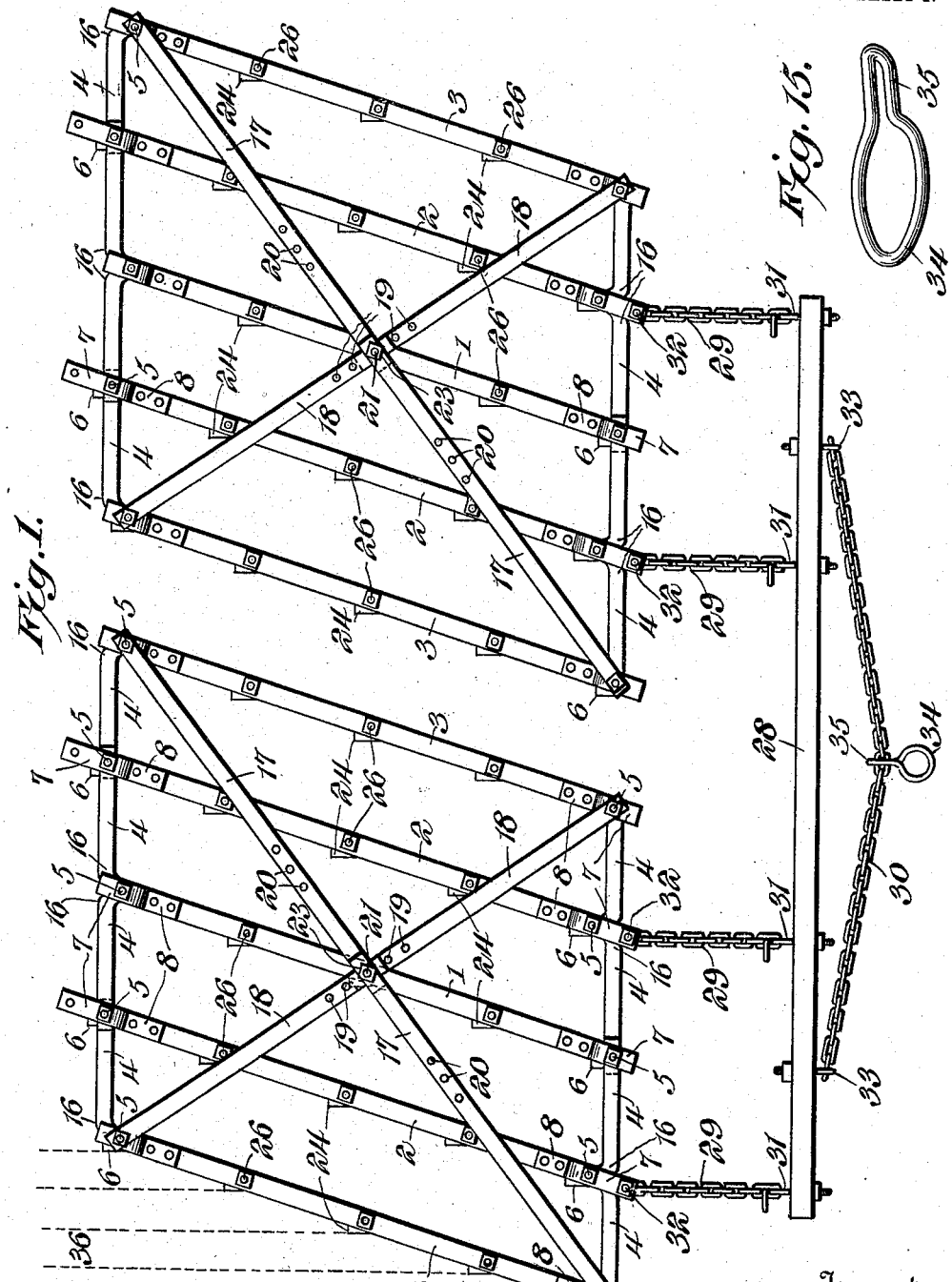

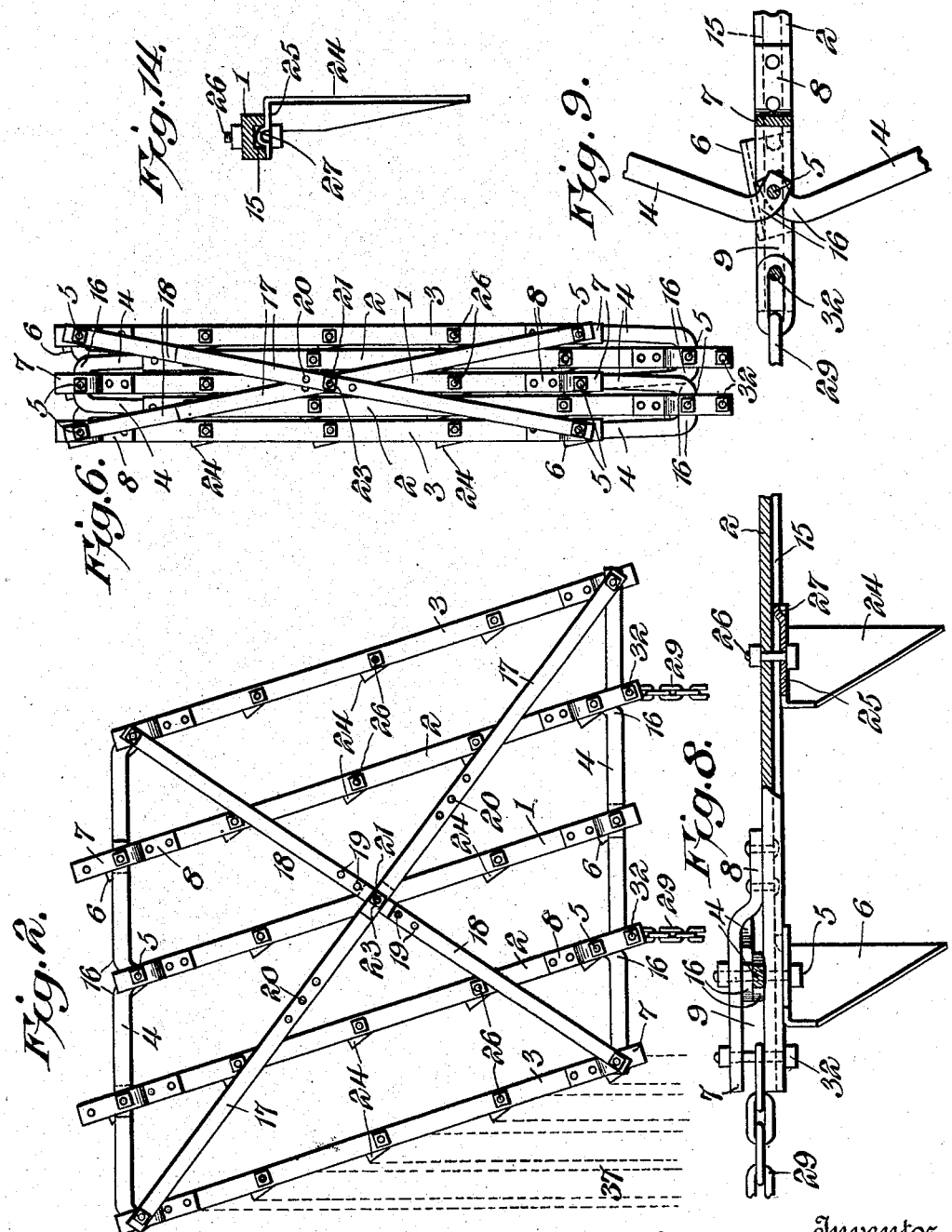

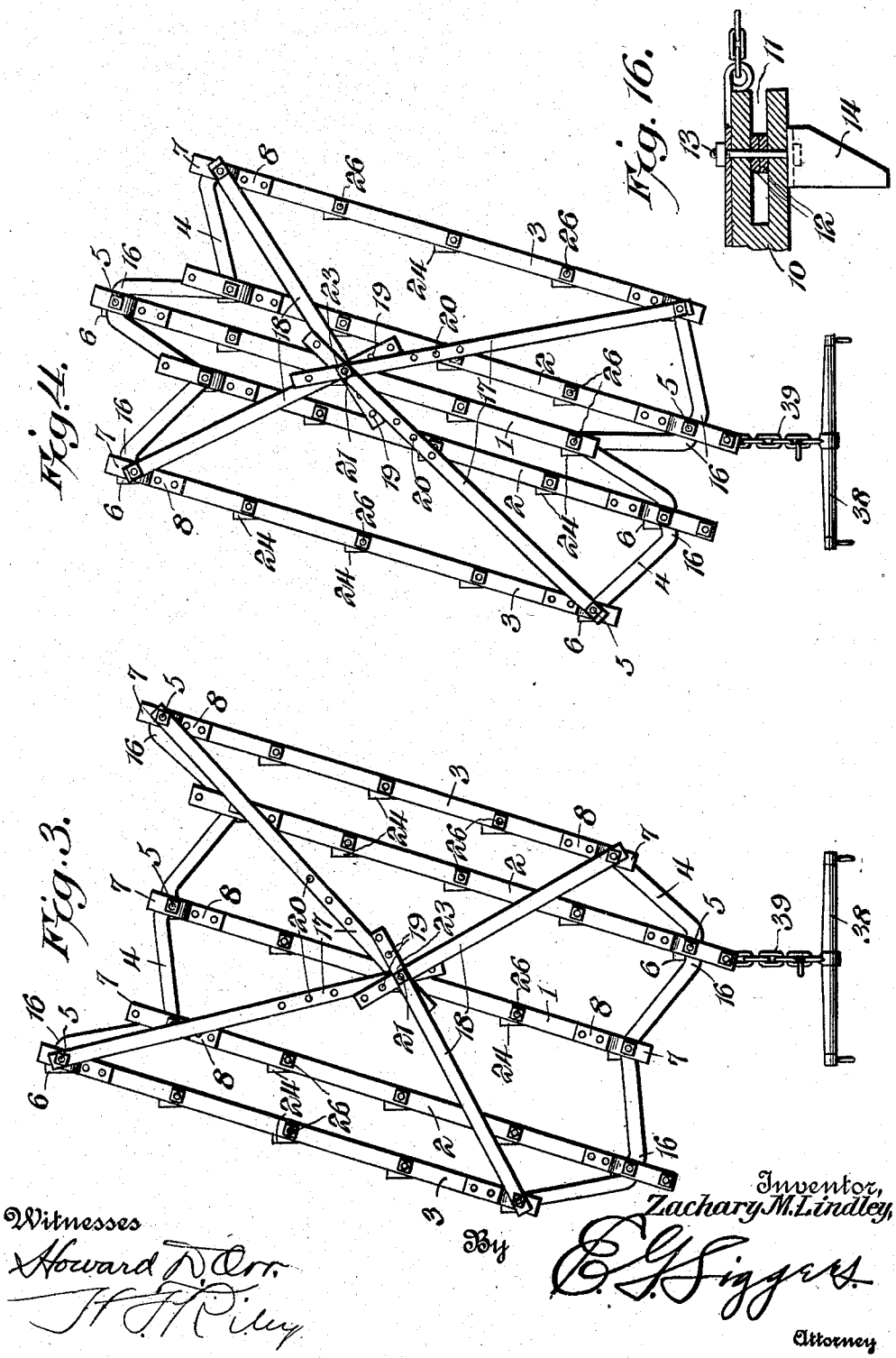

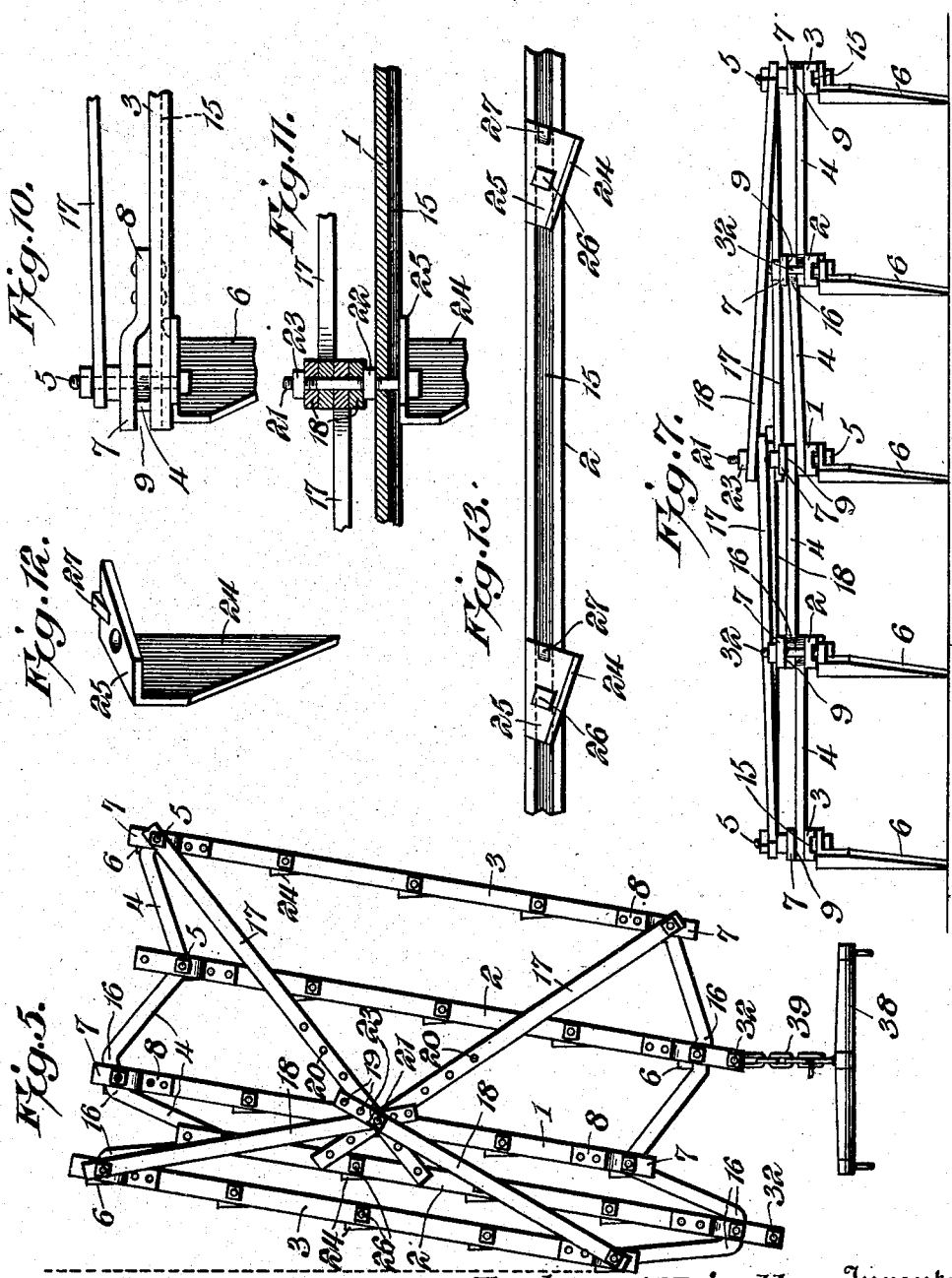

ZACHARY M. LINDLEY, OF CARTHAGE, MISSOURI, ASSIGNOR TO ROBERT M. SLOAN, OF CARTHAGE, MISSOURI.

FOLDABLE AND ADJUSTABLE HARROW.

No. 901,015.      Specification of Letters Patent.      Patented Oct. 13, 1908.

Application filed May 13, 1908. Serial No. 432,714.

*To all whom it may concern:*

Be it known that I, ZACHARY M. LINDLEY, a citizen of the United States, residing at Carthage, in the county of Jasper and State of Missouri, have invented a new and useful Foldable and Adjustable Harrow, of which the following is a specification.

The invention relates to improvements in harrows.

The object of the present invention is to improve the construction of harrows, and to provide a simple, inexpensive and efficient harrow of great strength and durability, adapted to be arranged in compact form for shipping and storing, and capable of ready adjustment to vary the width of its sections, and also the distance between the rows of teeth to adapt the harrow to the varying conditions of the soil and the plants under cultivation.

A further object of the invention is to provide a harrow section, having harrow teeth arranged in rows and capable of enabling the harrow teeth to be clustered or grouped either at the center of the harrow section, or at either or both sides of the same, whereby the teeth may be arranged to perform the desired amount of work at the desired points.

Another object of the invention is to provide a harrow adapted to change the position of the harrow teeth with relation to the soil without adjusting or changing the fastening devices for securing the teeth to the tooth carrying bars.

The invention also has for its object to provide harrow teeth, adapted to be arranged to present either their front edges or their side faces to the soil to adapt the harrow for cutting down sod and pulverizing the soil, and also to secure a disk like action for moving the soil laterally to destroy young grass, weeds, etc.

Furthermore, the invention has for its object to enable the harrow teeth to be secured to the tooth carrying bars by a single fastening device, and at the same time to prevent the harrow teeth from rotating on their fastening devices or becoming loosened through the expansion or contraction of the harrow sections.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a harrow, constructed in accordance with this invention, the tooth carrying bars of the harrow sections being adjusted to cause the harrow teeth to present their front edges to the soil. Fig. 2 is a plan view of one of the sections, the tooth carrying bars being arranged in the opposite position to cause the harrow teeth to present their side faces to the soil. Fig. 3 is a plan view of one of the harrow sections, the tooth carrying bars being arranged to group or cluster the teeth at each side of the harrow section. Fig. 4 is a similar view, the tooth carrying bars being arranged to cluster or group the teeth at the center of the harrow section. Fig. 5 is a plan view of one of the harrow sections, the teeth being grouped at one side of the harrow sections. Fig. 6 is a plan view of one of the sections, the tooth carrying bars being folded. Fig. 7 is a front elevation of one of the harrow sections. Fig. 8 is an enlarged detail sectional view, taken longitudinally of one of the intermediate tooth carrying bars. Fig. 9 is a horizontal sectional view of the same. Fig. 10 is an enlarged detail elevation of one of the corners of the harrow section. Fig. 11 is an enlarged detail sectional view, illustrating the manner of securing the overlapped ends of the braces at the center of the harrow. Fig. 12 is a detail perspective view of one of the harrow teeth. Fig. 13 is a reverse plan view of a portion of one of the tooth carrying bars, illustrating the arrangement of the harrow teeth. Fig. 14 is a detail sectional view, illustrating the manner of interlocking the harrow teeth with the tooth carrying bars. Fig. 15 is a detail view of the grab link for effecting a bodily adjustment of the harrow. Fig. 16 is a detail sectional view, illustrating a modification of the invention.

Like numerals of reference designate corresponding parts in all the figures of the drawings.

The harrow is composed of a plurality of harrow sections, each including a series of longitudinally disposed tooth carrying bars comprising a central bar 1, intermediate bars 2 and outer or side bars 3. The longitudinal tooth carrying bars, which are arranged in parallelism, are connected together by transversely disposed coupling links or members 4, consisting of flat bars pivoted by vertical bolts 5, each of which also serves to secure an end harrow tooth 6 to the longitudinal tooth carrying bars. The longitudinal tooth carrying bars or members are equipped at their ends with plates or members 7, having inner attached portions 8 secured by rivets, or other suitable fastening devices to the tooth carrying bars, as clearly illustrated in Figs. 8 and 10 of the accompanying drawings. The plates or members 7 are provided at intermediate points with upward bends or offsets, which space their outer portions from the upper faces of the tooth carrying bars or members to provide slots or openings 9 for the reception of links. The tooth carrying bars and the plates or members 7 are preferably constructed of metal, as shown in Figs. 1 to 14 of the accompanying drawings, but as illustrated in Fig. 16, a wooden tooth carrying bar 10 may be employed. The wooden tooth carrying bar 10 is provided with a terminal slot or opening 11, formed by bifurcating it and adapted to receive coupling links or members 12, pivoted to the tooth carrying bar 10 by a vertical bolt 13, which also secures a tooth 14 to the tooth carrying bar. Metallic tooth carrying bars are preferable, and when constructed of metal preferably consist of channel bars having grooves or channels 15 at their lower faces. The channeled metal not only secures a maximum strength, but also cooperates with the harrow teeth, as hereinafter described, for preventing the same from rotating on their fastening devices.

The transverse coupling links or members are each provided with a curved end 16, forming an elbow to permit compact folding of the tooth carrying bars, which are provided with terminal slots or openings for the ends of the coupling links or members. By arranging the terminals of the coupling links or members in slots or openings of the tooth carrying bars, upper and lower walls or engaging portions are provided to resist any tendency of the tooth carrying bars to tilt or twist, and the elbows, which coöperate with the terminal slots or openings, provide increased bearing surfaces for resisting any twisting action of the tooth carrying bars.

The elbows 16 of the front coupling links are arranged contiguous to each other in the slots or openings of the intermediate tooth carrying bars 2, and the rear transverse coupling links or members have their straight ends pivoted in the rear slots or openings of the intermediate tooth carrying bars or members 2. The curved ends of the inner or rear coupling links or members are pivoted in the rear terminal slot or opening of the central tooth carrying bars 1, while the curved ends of the outer coupling links or members are pivoted in the rear terminal slots or openings of the outside longitudinal tooth carrying bars 3. Also the outer coupling links or members have their terminals arranged flat upon the upper faces of the intermediate and outer longitudinal tooth carrying bars or members, as clearly illustrated in Fig. 7 of the accompanying drawings, and the inner coupling links or members have their outer terminals arranged upon the contiguous ends of the outer coupling links or members. One of the inner links has its inner end arranged flat upon the upper face of the central longitudinal tooth carrying bar or member, and it supports the inner end of the other inner link.

The tooth carrying bars of each harrow section are secured in their lateral adjustment and are maintained in parallelism by long and short diagonally arranged braces 17 and 18, pivoted at their outer ends to the corners of the harrow section by the adjacent bolts 5, and provided at their inner portions, which are overlapped, with perforations 20 and 19, arranged at intervals and adapted to receive a central bolt 21, which also secures a harrow tooth to the central tooth carrying bar. The perforations 19 and 20, which may be of any desired number, permit the inner ends of the braces to be adjusted inwardly and outwardly to correspond with the adjustment of the tooth carrying bars of the harrow sections. The outer ends of the diagonal braces are arranged upon the upper faces of the plates or members 7, and the central bolt 21, which engages the inner portions of the diagonal braces, has its head at its lower end and is equipped at an intermediate point with a nut 22 for engaging the upper face of the central tooth carrying bar. The central bolt 21 projects above the central tooth carrying bar, and is provided with an upper nut 23 for retaining the diagonal braces on the projecting portion of the central bolt. In harrows there is always a tendency of the outer tooth carrying bars to tilt or rise above the intermediate bars. This tendency is counter-acted by the aforesaid horizontal arrangement of the outer links and by the braces, which, as illustrated in Fig. 7 of the drawings, are built up at the center of the harrow section and slightly incline from the central bolt to the corner bolts. The diagonal braces by extending from the center to the corners of the harrow sections rigidly lock the central, intermediate and outer tooth carrying bars in their various adjustments, and they also serve to lock the harrow sections when the same are folded in the position illustrated in Fig. 6 of the drawings. The diagonal braces then positively retain the harrow sections in their folded position while they are being handled, stored or shipped.

The central, intermediate and outside tooth carrying bars are equipped at intervals with harrow teeth 24, preferably tapered downwardly, as shown, and provided at the top with a horizontal attaching portion 25 for the reception of a bolt 26, or other suitable fastening device for securing the attaching portion to the lower faces or edges of the tooth carrying bars. In order to prevent the harrow teeth from turning on the fastening devices and thereby getting out of position, the horizontal attaching portion 25 is provided in its lower face with an indentation, forming an upwardly extending lug or projection 27, which extends into the groove or channel of the tooth carrying bar and engages the latter and effectually locks the harrow tooth against rotary movement on the fastening device thereof. The end and central harrow teeth are interlocked with the tooth carrying bars in the same manner as the other harrow teeth, and by this construction the lateral adjustment of the tooth carrying bars in expanding or contracting the harrow sections does not affect the fastening devices of the harrow teeth, and cannot operate to loosen the same. Also by arranging the links in the slots or openings of the tooth carrying bars, they are out of the way of both the teeth and the braces and do not interfere with the uniform arrangement of the teeth or with the operation of the braces.

The harrow teeth are set at a slight angle to the side faces of the tooth carrying bars, as clearly illustrated in Fig. 13 of the drawings, and the tooth carrying bars are, as hereinafter described, arranged at different angles to the line of draft to position the teeth in line with the draft or at an angle to the same to cause the teeth to present either their front edges or their side faces to the soil. The position of the harrow teeth with relation to the line of draft may be adjusted by means of a draft attachment including a transverse draft bar 28, short longitudinal connecting chains 29 and a transverse adjustable chain 30. The short longitudinal chains, which are adjustably secured to the transverse draft bar 28 by hook bolts 31, are connected to the front ends of the intermediate tooth carrying bars by means of bolts 32. The rear links of the short longitudinal chains are arranged in the front slots or openings of the intermediate tooth carrying bars, which are preferably extended, as shown. The hook bolts 31, which are provided at the front edge or face of the transverse draft bar with nuts, are adjustable longitudinally to open and close the hooks, which are located at the rear edge or face of the transverse draft rod. By moving the hooks rearwardly their mouths are opened, and the short chains may be lengthened or shortened.

The transverse chain 30, which is secured at its terminals to the front edge of the transverse draft bar by eye bolts 33, receives a grab link 34, consisting of a substantially circular front portion and an approximately U-shaped rear loop 35 of a width less than the diameter of the front portion. The substantially circular front portion of the grab link is adapted to be attached to a doubletree, and it is connected with the sides of the U-shaped rear portion 35, and the latter is adapted to engage with the links of the transverse chain 30 and may be arranged at either side of the center, whereby the harrow may be adjusted bodily to change the angle of the tooth carrying bars with relation to the line of draft.

By arranging the tooth carrying bars at an angle to the line of draft, either the front edges of the harrow teeth may be presented to the soil to secure a cutting action, or the side faces may be presented to a greater or less degree to the soil to secure a disk like action for moving the soil laterally. When the rear ends of the tooth carrying bars are swung to the left of the line of draft, as illustrated in Fig. 1 of the drawings, diamond-shaped harrow sections are provided, and the harrow teeth present their front edges to the ground for cutting down sod and pulverizing the soil. In this position the harrow teeth produce thin cuts, illustrated by the dotted lines 36 in Fig. 1 of the drawings. The tooth carrying bars may also have their rear portions swung over to the right, as illustrated in Fig. 2 of the drawings to present the side faces of the harrow teeth to the soil. The harrow teeth when in this position engage the soil between the dotted lines 37, and are adapted to work all the soil laterally for covering up and destroying young grass, weeds, etc. By changing the angular position of the tooth carrying bars from one side to the other, the teeth are adjusted to secure either a cutting or a disk like action, without adjusting or changing the fastening devices for securing the harrow teeth to the tooth carrying bars.

In Figs. 1 and 2 of the drawings, all of the tooth carrying bars are arranged the same distance apart, but in cultivating standing corn, cotton and various other plants, it may be desired to work the ground more close to the plants than at the center of the space between the rows, and in Fig. 3 of the drawings the harrow section, which is then used independently of the other harrow section, has its intermediate and outer tooth carrying bars arranged comparatively close together, while there is considerable space between the central and intermediate tooth carrying bars. This arrangement brings more teeth to the side portions of the harrow and more work will be performed at those points.

In Fig. 4 of the drawings, the teeth are clustered or grouped closely together at the center of the harrow section and are widely spaced at the sides thereof. The central and intermediate tooth carrying bars are arranged close together, and the outer tooth carrying bars are spaced a considerable distance from the intermediate tooth carrying bars. The separate harrow sections are designed to be drawn by a single horse, and a swingletree 38 is connected by a chain 39 with one of the intermediate bars. When the harrow section is in either of the positions illustrated in Figs. 3 and 4 of the drawings, the position of the harrow teeth with relation to the soil may be changed by changing the swingletree from one intermediate bar to the other. This change in the point of the attachment of the swingletree will enable the teeth to present either their front edges or side faces to the soil.

It is also desirable, although exceedingly difficult, to cultivate the soil close to the roots of blackberry bushes and similar plants, and in Fig. 5 of the drawings is illustrated an arrangement of the harrow section to secure this result. The central, intermediate and side tooth carrying bars at one side of the harrow section are arranged close together and are spaced a considerable distance apart at the other side of the harrow section. The swingletree is hitched to the front end of the intermediate tooth carrying bar at the open side of the harrow section. This will permit the closed side of the harrow to extend beneath the bushes and the closely arranged group of teeth carried by the closed side of the harrow will work the soil close to the roots of the bushes.

When the harrow sections are arranged, as shown in Figs. 1 and 2 of the drawings, the long and short diagonal braces correspond with the long and short diagonals of the diamonds formed by the harrow sections, and in changing from one position to the other, the corner bolts are loosened and the braces are rotated one quarter of a revolution in changing from one of the said positions to the other.

When a single harrow section is used, as illustrated in Figs. 3 to 5 inclusive, the two short braces are arranged at the same side or end, and one half of a revolution of the braces around the pivot bolt is necessary when the harrow section is changed from the position shown in Fig. 3 to that shown in Fig. 4 and vice versa.

Having thus fully described my invention, what I claim as new and desire to secure by Letters Patent, is:—

1. A harrow including a series of longitudinally disposed tooth carrying bars, means for connecting the tooth carrying bars to permit their lateral adjustment and to maintain them in parallel relation during such lateral adjustment, and longitudinally adjustable diagonal braces extending from the center to the corners of the harrow and rigidly retaining the tooth carrying bars in their adjusted positions.

2. A harrow including a series of longitudinally disposed tooth carrying bars, means for connecting the tooth carrying bars to permit their lateral adjustment and to maintain them in parallel relation during such lateral adjustment, and diagonally disposed braces extending from the center to the corners of the harrow and inclined downwardly toward the said corners to counteract the tendency of the side bars to rise.

3. A harrow including a series of parallel longitudinally disposed tooth carrying bars provided with terminal openings, transversely disposed coupling links pivoted in the openings of the tooth carrying bars and permitting a lateral adjustment of the same and maintaining the tooth carrying bars in parallelism during such lateral adjustment, and diagonally arranged braces pivoted to the corners of the harrow and having overlapped inner ends adjustably secured together at the center of the harrow.

4. A harrow including a series of parallel longitudinally disposed tooth carrying bars provided with terminal openings, transverse coupling links pivoted in the openings of the tooth carrying bars to permit the same to be adjusted laterally and to maintain said bars in parallelism, said links being also provided with elbows to enable the tooth carrying bars to fold flat against each other, and means connected with the tooth carrying bars for rigidly retaining the same in their adjustment.

5. A harrow including a series of tooth carrying bars having terminal openings, links having their terminals arranged in the openings, fastening devices pivoting the links to the tooth carrying bars, and harrow teeth secured to the bars by the said fastening devices.

6. A harrow including a series of tooth carrying bars provided with terminal openings, harrow teeth, fastening devices piercing the tooth carrying bars and securing the harrow teeth to the same, transverse coupling links having their terminals pivoted in the openings of the tooth carrying bars by the said fastening devices, and diagonal braces extending from the center of the harrow to the corners thereof and secured to the same by the said fastening devices.

7. A harrow including a series of parallel longitudinal tooth carrying bars having terminal openings, harrow teeth, fastening devices piercing the said bars and securing the harrow teeth to the same, transverse coupling links pivoted to the openings of the tooth carrying bars by the said fastening devices and having elbows to permit the bars to fold flat against each other, and braces secured to the tooth carrying bars by the said fastening devices for holding the bars in their adjustment.

8. A harrow including a series of tooth carrying bars provided at their terminals with members having inner attaching portions and provided with outer portions spaced from the bars to form openings, transverse coupling links pivoted in the openings and provided with elbows to permit the tooth carrying bars to fold flat against each other, and means connected with the tooth carrying bars for rigidly retaining the same in their adjustment.

In testimony, that I claim the foregoing as my own, I have hereto affixed my signature in the presence of two witnesses.

ZACHARY M. LINDLEY.

Witnesses:
JOHN H. SIGGERS,
EDITH L. BROWN.